United States Patent [19]

Persico et al.

[11] 4,167,553
[45] * Sep. 11, 1979

[54] CATALYTIC REACTION CHAMBER FOR GRAVITY-FLOWING CATALYST PARTICLES

[75] Inventors: Paul J. Persico, Hinsdale; Robert F. Millar, Mc Cook; Robert H. Jensen, Clarendon Hills, all of Ill.

[73] Assignee: UOP Inc., Des Plaines, Ill.

[*] Notice: The portion of the term of this patent subsequent to Feb. 27, 1996, has been disclaimed.

[21] Appl. No.: 877,586

[22] Filed: Feb. 13, 1978

Related U.S. Application Data

[63] Continuation-in-part of Ser. No. 822,164, Aug. 5, 1977.

[51] Int. Cl.² .................... B01J 8/12; C10G 35/12
[52] U.S. Cl. .................... 422/216; 208/165; 208/168; 422/218; 422/219
[58] Field of Search ............ 23/288 B, 288 G, 288 C, 23/288 D; 208/140, 152, 165, 168, 169, 171, 175; 55/390; 422/216, 218, 219, 310, 311

[56] References Cited

U.S. PATENT DOCUMENTS

| | | | |
|---|---|---|---|
| 2,634,194 | 4/1953 | Nebeck | 23/288 R |
| 2,683,654 | 7/1954 | Bergman | 23/288 R |
| 3,470,090 | 9/1969 | Carson | 208/138 |
| 3,647,680 | 3/1972 | Greenwood et al. | 208/65 |
| 3,706,536 | 12/1972 | Greenwood et al. | 208/140 X |
| 3,725,248 | 4/1973 | Greenwood et al. | 208/138 |
| 3,854,887 | 12/1974 | Heinze et al. | 23/288 G |
| 3,864,240 | 2/1975 | Stone | 208/64 |

*Primary Examiner*—Joseph Scovronek
*Attorney, Agent, or Firm*—James R. Hoatson, Jr.; Robert W. Erickson; William H. Page, II

[57] ABSTRACT

A catalytic reaction chamber for contacting a reactant stream with catalyst particles which are disposed as an annular-form bed and are downwardly movable therethrough via gravity-flow. The annular catalyst bed is spaced between a catalyst-retaining screen and a scalloped, perforated centerpipe. A plurality of vertically-positioned catalyst-transfer, or withdrawal, conduits are circumferentially-disposed substantially adjacent the outer surface of the scalloped centerpipe and extend the entire length of the catalyst bed. These contain a first plurality of apertures which face into the bed of catalyst particles and which are sized to permit catalyst particles to flow therethrough. A second plurality of apertures is disposed opposite the first plurality of apertures, and sized to inhibit the flow of catalyst particles therethrough. The latter serve to conduct reactant stream vapors out of the transfer conduits into the scalloped, perforated centerpipe and insure a hydrogen atmosphere surrounding the catalyst particles flowing therethrough.

12 Claims, 13 Drawing Figures

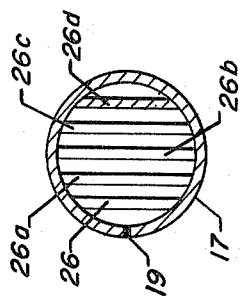
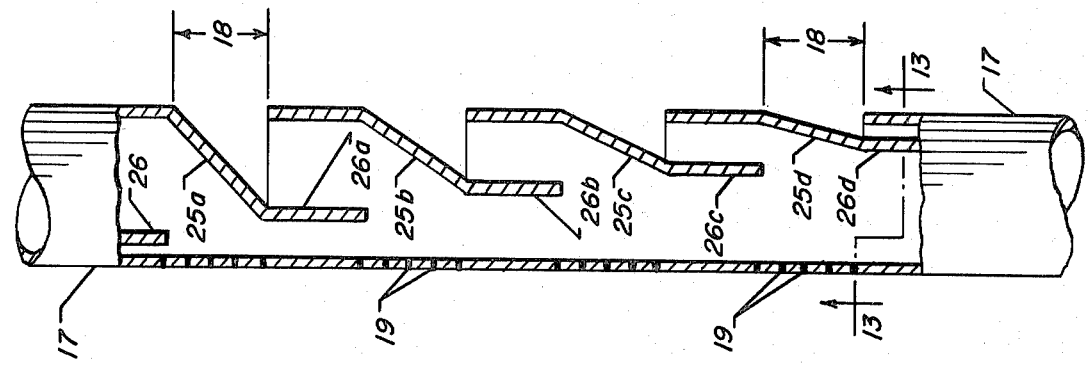
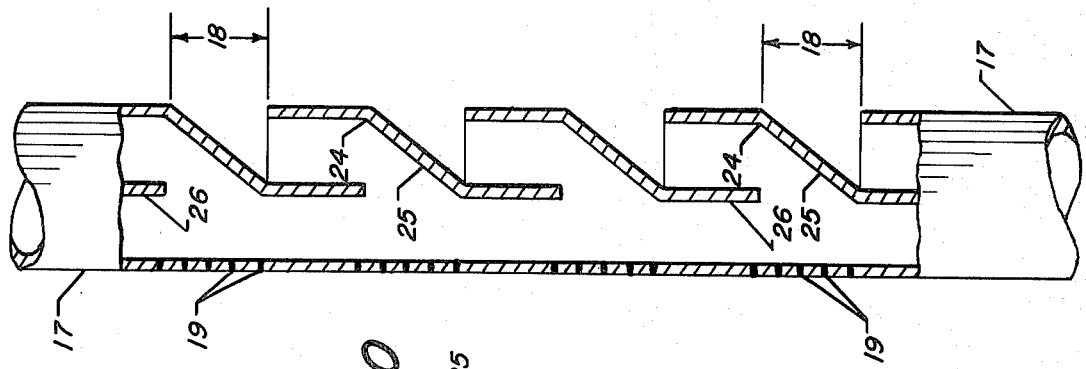
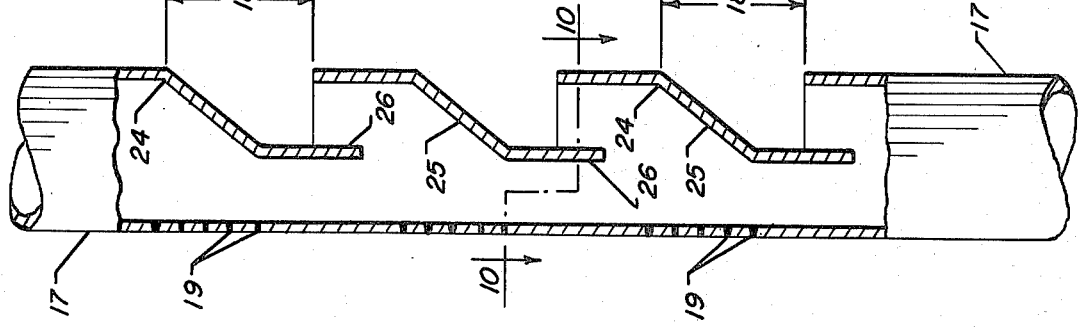

CATALYTIC REACTION CHAMBER FOR GRAVITY-FLOWING CATALYST PARTICLES

RELATED APPLICATION

The present application is a Continuation-In-Part of our copending application, Ser. No. 822,164, filed Aug. 5, 1977, all the teachings of which are incorporated herein by way of specific reference thereto.

APPLICABILITY OF INVENTION

The present invention is directed toward an improved reaction chamber for effecting the catalytic conversion of a hydrocarbonaceous reactant stream in a multiple-stage system wherein (i) the reactant stream flows serially through the plurality of reaction zones, (ii) the catalyst particles are movable through each reaction zone via gravity-flow and, (iii) catalyst particles are movable via gravity from one zone to the next succeeding zone. More particularly, the described process technique is adaptable for utilization in vapor-phase systems wherein the conversion reactions are principally endothermic, and where the flow of the hydrocarbonaceous reactant stream, with respect to the downward direction of catalyst particle movement, is cocurrent and essentially radial.

Various types of multiple-stage reaction systems have found widespread utilization throughout the petroleum and petrochemical industries for effecting multitudinous reactions, especially hydrocarbon conversion reactions. Such reactions are either exothermic, or endothermic, and encompass both hydrogen-producing and hydrogen-consuming processes. Multiple-stage reaction systems generally take one of two forms: (1) side-by-side configuration with intermediate heating between the reaction zones, wherein the reactant stream or mixture flows serially from one zone to another zone; and, (2) a stacked design wherein a single reaction chamber, or more, contains the multiple catalytic contact stages. Such reactor systems, as applied to petroleum refining, have been employed to effect numerous hydrocarbon conversion reactions including those which are prevalent in catalytic reforming, ethylbenzene dehydrogenation to produce styrene, other dehydrogenation processes, etc. Our invention is specifically intended for utilization in those processes where (1) the conversion reactions are effected in vapor-phase and, (2) catalyst particles are downwardly movable via gravity-flow; and, where the reaction system exists in side-by-side relation, where two or more catalytic contact zones are "stacked", or where one or more additional reaction zones are disposed in a side-by-side relationship with the vertical stack.

Since catalyst particles which are movable through a reaction system by way of gravity-flow are necessarily moving in a downwardly direction, the present technique contemplates the withdrawal of catalyst particles from a bottom portion of one reaction zone and the introduction of fresh, or regenerated catalyst particles into the top portion of a second reaction zone. The present technique is also intended to be applied to those reaction systems wherein the catalyst is disposed as an annular bed and the flow of the reactant stream, serially from one zone to another, is perpendicular, or radial to the movement of catalyst particles.

A present day radial-flow reaction system generally consists of tubular-form sections, having varying nominal cross-sectional areas, vertically and coaxially disposed to form the reaction vessel. Briefly, the system comprises a reaction chamber containing a coaxially-disposed catalyst-retaining screen, having a nominal, internal cross-sectional area less than said chamber, and a perforated centerpipe having a nominal, internal cross-sectional area which is less than the catalyst-retaining screen. The reactant stream is introduced, in vapor-phase, into the annular-form manifold space created between the inside wall of the chamber and the outside surface of catalyst-retaining screen. The latter forms an annular-form, catalyst-holding zone with the outside surface of the perforated centerpipe; vaporous reactant flows laterally and radially through the screen and catalyst zone into the centerpipe and out of the reaction chamber. Although the tubular-form configuration of the various reactant components may take any suitable shape—e.g., triangular, square, oblong, diamond, etc.—many design, fabrication and technical considerations dictate the advantages of using components which are substantially circular in cross-section.

Illustrative of a multiple-stage stacked reactor system, to which the present invention is particularly adaptable, is that shown in U.S. Pat. No. 3,706,536 (Cl. 23-288G), issued Dec. 19, 1972. Transfer of the gravity-flowing catalyst particles, from one reaction zone to another, as well as introduction of fresh catalyst particles and withdrawal of "spent" catalyst particles, is effected through the utilization of a plurality of catalyst-transfer, or withdrawal conduits. Experience in the use of such systems, as well as those where the reaction zones are disposed in a side-by-side relationship indicates that high vapor flow through the annular-form catalyst-holding sections results in catalyst particles being "pinned" in the vicinity of the perforated, substantially circular cylindrical centerpipe. Created thereby are stagnant catalyst areas where the catalyst particles are prevented from assuming a downward, uniform gravity-flow pattern. The stagnant catalyst eventually loses its effectiveness due to coke deposition, whereas in a flowing configuration the aged catalyst is continually removed and replaced with newer, fresh catalyst.

OBJECTS AND EMBODIMENTS

A principal object of our invention is to prevent, or alleviate catalyst "pinning" (thus, stagnant catalyst areas) in a hydrocarbon conversion system in which catalyst particles are movable via gravity-flow. A corollary objective is to provide an improved catalytic reaction chamber for utilization in a multiple-stage stacked reactor system in which catalyst particles in each reaction zone are movable via gravity-flow, and catalyst particles flow from one zone to the next succeeding reaction zone by way of gravity-flow.

Another object attainable through the use of our inventive concept is improvement in a substantially endothermic hydrocarbon conversion system which is effected in vapor-phase and wherein the catalyst particles are downwardly movable via gravity-flow.

Another principal object is to provide a novel scalloped, perforated centerpipe for utilization in reaction systems wherein the catalyst particles are movable by way of gravity-flow.

Therefore, in one embodiment, our invention provides a catalytic reaction chamber for effecting contact of a reactant stream with catalyst particles which are (1) disposed as an annular-form bed and, (2) downwardly movable therethrough via gravity-flow, said reaction chamber comprising, in cooperative relationship: (a) an outer, perforated catalyst-retaining screen (i) concentrically-disposed within and, (ii) having a cross-sectional area less than said chamber to provide a reactant stream manifold space therebetween; (b) an inner, perforated scalloped centerpipe (i) concentrically-disposed within and, (ii) having a cross-sectional area less than said catalyst-retaining screen to provide said annular-form catalyst bed therebetween; (c) a plurality of catalyst inlet conduits connected to the upper portion of said chamber and communicating with said annular-form catalyst bed; and, (d) a plurality of vertically-positioned, catalyst-transfer or withdrawal conduits (i) circumferentially-disposed substantially adjacent the outer surface of said scalloped centerpipe, (ii) extending substantially the entire length of said annular-form catalyst bed and, (iii) containing a first plurality of apertures facing into said catalyst bed and sized to permit catalyst particles to flow therethrough, and a second plurality of apertures facing said perforated centerpipe and sized to inhibit the flow of catalyst particles therethrough.

In another embodiment, the scalloped centerpipe has disposed therein, and is in contact with, a second, substantially cylindrical perforated centerpipe.

These, as well as other objects and embodiments will become evident from the following, more detailed description of the present hydrocarbon conversion reaction chamber. In one such other embodiment, the catalyst-transfer conduits contain a plurality of internal inclined baffles, each one of which extends downwardly from the upper-most periphery of each of the apertures in said first plurality.

PRIOR ART

Candor compels recognition of the fact that various types of hydrocarbon conversion processes utilize multiple-stage reactor systems, either in a side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While our inventive concept is adaptable to many conversion reactions and processes, through the reactor system of which the catalyst particles are movable via gravity-flow, the same will be further described in conjunction with the well known endothermic catalytic reforming process.

Historically, catalytic reforming was effected in a non-regenerative, fixed-bed system comprising a plurality of reaction zones disposed in side-by-side relation. When the catalytic composite had become deactivated to the extent that continuous operation was no longer economically feasible, the entire unit was shut-down and the catalyst regenerated in situ. Of a more recent vintage was the so-called "swing bed" system in which an extra reactor was substituted for one which was due to be placed off-stream for regeneration purposes. Still more recently, multiple-stage reactor systems have been provided in which the catalyst particles flow, via gravity, through each reaction zone. In a "stacked" system, the catalyst particles also flow downwardly from one catalyst-containing zone to another, and ultimately transfer to a suitable regeneration system also preferably functioning with a downwardly-moving bed of catalyst particles. In effect, the catalyst particles are maintained from one section to another in a manner such that the flow of catalyst particles is continuous, at frequent intervals, or at extended intervals, with the movement being controlled by the quantity of catalyst withdrawn from the last of the series of individual reaction zones.

U.S. Pat. No. 3,470,090 (Cl. 208-138), issued Sept. 30, 1969, is illustrative of a multiple-stage, side-by-side reaction system with intermediate heating of the reactant stream which flows serially through the individual reaction zones. Catalyst particles withdrawn from any one of the reaction zones are transported to suitable regeneration facilities. This type of system can be modified to the extent that the catalyst particles withdrawn from a given reaction zone are transported to the next succeeding reaction zone, while the catalyst withdrawn from the last reaction zone may be transported to a suitable regeneration facility. The necessary modifications can be made in the manner disclosed in U.S. Pat. No. 3,839,197 (Cl. 208-174), issued Oct. 1, 1974, involving an inter-reactor catalyst transport method. Catalyst transfer from the last reaction zone in the plurality to the top of the catalyst regeneration zone is made possible through the use of the technique illustrated in U.S. Pat. No. 3,839,196 (Cl. 208-174), issued Oct. 1, 1974.

A stacked reaction zone configuration is shown in U.S. Pat. No. 3,647,680 (Cl. 208-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288G), issued Sept. 19, 1972, and U.S. Pat. No. 3,725,249 (Cl. 208-139) issued Apr. 3, 1973.

U.S. Pat. No. 3,725,248 (Cl. 208-138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities.

As hereinbefore stated, general details of a three-reaction zone, stacked system are presented in U.S. Pat. No. 3,706,536 (Cl. 23-288G), issued Dec. 19, 1972, which illustrates one type of multiple-stage system to which the present inventive concept is applicable. The particularly preferred construction of the catalyst-retaining screen member and perforated centerpipe are shown therein. These are fabricated from a multiplicity of closely spaced, vertically-disposed wedge-shaped wires, or bars. This produces a minimum of friction and attrition as the catalyst particles move downwardly via gravity-flow. As generally practiced in a catalyst reforming unit, each succeeding reaction zone contains a greater volume of catalyst.

These illustrations are believed to be fairly representative of the art which has been developed in multiple-stage conversion systems wherein catalyst particles are movable through each reaction zone via gravity-flow. Noteworthy is the fact that none recognize the existence of stagnant catalyst areas which result when catalyst particles are pinned to the perforated centerpipe by the lateral/radial flow of vapor across the annular-form catalyst bed.

U.S. Pat. No. 3,864,240 (Cl. 208-64), issued Feb. 4, 1975, is illustrative of the integration of a reaction system having gravity-flowing catalyst particles with a fixed-bed system. In the illustrated modification, it is suggested that a second compressor be added to permit the split-flow of hydrogen-rich recycle gas. The use of the additional compressor would be to supply the necessary hydrogen recycle to the moving-bed portion of the system, while the original compressor supplies the hydrogen recycle to the plurality of fixed-bed reaction zones. Therefore, the moving-bed reaction zone must handle all the vaporous material in the system including the recycle hydrogen from its own compressor and the total effluent from the last of the fixed-bed reaction zones. Again, there is no recognition of the difficulties attendant catalyst pinning in the zone where the catalyst particles are movable via gravity-flow. Quite obviously, this particular pinning problem is nonexistent in a fixed-bed reaction system.

In brief summation, the prior art directed toward catalytic conversion systems in which catalyst particles are movable via gravity-flow, is not cognizant of the existence of a catalyst pinning problem. Therefore, there can be no awareness of the solution supplied by the catalytic reaction chamber constituting the present invention. The catalyst-transfer, or withdrawal, conduits of the prior art are situated only in the lower portion of the annular-form catalyst bed. The open ends thereof are adapted with inverted conical-form baffles which are spaced above and concentric with the open ends. Furthermore, it will be recognized that the perforated centerpipes, utilized in those processes exemplified by the prior art, are all substantially cylindrical as contrasted to the scalloped centerpipe which constitutes the basis upon which the present invention is founded.

SUMMARY OF INVENTION

To reiterate briefly, the reaction chamber encompassed by our inventive concept is suitable for use in hydrocarbon conversion systems which are characterized as multiple-stage and in which catalyst particles are movable via gravity-flow through each reaction zone. Furthermore, the present invention is primarily intended for utilization in reactor systems where the principal reactions are endothermic and effected in vapor-phase. Although the following discussion is specifically directed toward catalytic reforming of naphtha boiling range fractions, there is no intent to so limit the present invention. Catalytic reforming, as well as many other processes, has experienced several phases of development currently terminating in the system in which the catalyst beds assume the form of a descending column in one or more reaction vessels. Typically, the catalysts are utilized in spherical form, having a nominal diameter ranging from about 1/32-inch to about 5/32-inch; this offers free-flow characteristics which are intended neither to bridge, nor to block the descending column, or columns of catalyst within the overall reactor system.

In one such multiple-stage system, the reaction chambers are vertically stacked, and a plurality (generally from about 4 to about 16) of relatively small diameter conduits are employed to transfer catalyst particles from one reaction zone to the next lower reaction zone (via gravity-flow) and ultimately to withdraw catalyst particles from the last reaction zone. The latter are usually transported to the top of a catalyst regeneration facility, also functioning with a descending column of catalyst particles; regenerated catalyst particles are then transported to the top of the upper reaction zone of the stack. In order to facilitate and enhance gravity-flow within each reaction vessel, as well as from one zone to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the next succeeding zone, and from the last reaction zone to the top of the regeneration facility.

Catalytic reforming of naphtha boiling range hydrocarbons, a vapor-phase operation, is effected at conversion conditions which include catalyst bed temperatures in the range of about 700° F. to about 1020° F.; judicious and cautious techniques generally dictate that catalyst temperatures not substantially exceed a level of about 1020° F. Other conditions generally include a pressure from about 50 psig. to about 1000 psig., a liquid hourly space velocity (defined as volumes of fresh charge stock per hour, per volume of total catalyst particles) of from 0.2 to about 10.0 and a hydrogen to hydrocarbon mole ratio generally in the range of about 0.5:1.0 to about 10.0:1.0. As those possessing the requisite skill in the petroleum refining art are aware, the described continuous regenerative reforming system offers numerous advantages when compared to the prior art fixed-bed systems. Among these is the capability of efficient operation at comparatively lower pressures—e.g. 50 psig. to about 200 psig.—and higher liquid hourly space velocities—e.g. about 3.0:1.0 to about 8.0:1.0. As a result of continuous catalyst regeneration, higher consistent inlet catalyst bed temperatures can be maintained—e.g. 950° F. to about 1010° F. Furthermore, there is afforded a corresponding increase in both hydrogen production and hydrogen purity in the recycled vaporous phase from the product separation facility.

Catalytic reforming reactions are multifarious, and include dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions, the net result of which is endothermicity, are effected through the utilization of one or more Group VIII noble metals (e.g. platinum, iridium, rhodium, palladium) combined with a halogen (e.g. chlorine and/or fluorine) and a porous carrier material such as alumina. Recent investigations have indicated that more advantageous results are attainable and enjoyed through the cojoint use of a catalytic modifier; these are generally selected from the group of cobalt, nickel, gallium, germanium, tin, rhenium, vanadium and mixtures thereof. Regardless of the particular selected catalytic composite, the ability to attain the advantage over the common fixed-bed systems is greatly dependent upon achieving acceptable catalyst flow downwardly through the system. Not only must this be substantially uniform throughout the cross-section of the annular catalyst bed, but stagnant areas of catalyst must be maintained at the most achievable minimum.

Catalytic reforming is a well known process which has been thoroughly described in the literature, having been a commercially important tool of the petroleum refining industry for about three decades. One of the many things gleaned from the vast amount of catalytic reforming experience, and resulting knowledge, is the soundness of utilizing multiple stages, each of which contains a different quantity of catalyst. The reactant stream, hydrogen and the hydrocarbon feed, flow serially through the reaction zones in order of increasing catalyst volume with, of course, interstage heating. In a three-reaction zone system, typical catalyst loadings are: first, 10.0% to about 30.0%; second, from about 20.0% to about 40.0%; and, third, from about 40.0% to about 60.0%. With respect to a four-reaction zone system, suitable catalyst loading would be: first, 5.0% to about 15.0%; second, 15.0% to about 25.0%; third, 25.0% to about 35.0%; and, fourth, 35.0% to about 50.0%. Unequal catalyst distribution, increasing in the serial direction of reactant stream flow, facilitates and enhances the distribution of the reactions as well as the overall heat of reaction.

As hereinbefore stated, the pinning of catalyst to the perforated centerpipe stems primarily from the high vapor velocity laterally across the annular-form catalyst-holding zone; this adverse effect increases in degree as the cross-sectional area and length of the catalyst bed decreases. In multiple-stage catalytic reforming systems, therefore, the effect is most pronounced in the first and second reaction zones, having the smaller annular cross-sectional areas and lengths, somewhat less in the third reaction zone and of a relatively minor consequence in the fourth reaction zone due to its length and larger cross-sectional catalyst area.

The present invention is founded upon a novel construction of the perforated centerpipe which provides the annular-form catalyst bed with the outer catalyst-retaining screen. Perforated centerpipes are, in accordance with the technique herein described, scalloped, and may contain an internal, substantially cylindrical perforated centerpipe of the prior art. That is, existing cylindrical, perforated centerpipes may be readily adapted with a plurality of scallops which are also perforated. In either event, the centerpipe will generally have from three to about sixteen scallops which are circumferentially-disposed in alternating relationship with a like number of the catalyst-transfer or withdrawal conduits. Preferably, the catalyst-transfer conduits which formed the basis of our previously mentioned copending application are employed in combination with the perforated, scalloped centerpipe. These conduits, used to withdraw catalyst particles from an annular bed and transfer them either into the annular bed of a succeeding reaction zone, or into a withdrawal and transport vessel for introduction into a regeneration tower, are vertically-positioned and circumferentially-disposed substantially adjacent the outer surface (catalyst side) of the perforated centerpipe. As hereinafter illustrated in the accompanying drawings, the conduits are disposed in alternating sequence with the scallops. They extend substantially the entire length of the annular-form bed of catalyst-particles, commencing just below the outlet ends of those conduits used to introduce or transfer catalyst particles to the reaction chamber. Each conduit contains a first plurality of apertures, or openings, which face into the catalyst bed and which are sized to permit catalyst particles to flow therethrough. These catalyst access openings are uniformly disposed along the length of the conduit within the catalyst bed to afford uniform transfer of the catalyst particles. A second plurality of apertures, disposed substantially 180° opposite the catalyst access openings, face inwardly toward the perforated centerpipe, and are sized to inhibit the flow of catalyst particles therethrough. These smaller openings conduct reactant vapors, which enter with catalyst particles, from the conduits into the perforated centerpipe. More importantly, these openings provide a flow path for the reactant stream such that the catalyst particles within the conduits are maintained in a hydrogen-enriched atmosphere.

The catalyst transfer and withdrawal conduits will generally number from about three to about sixteen. The precise number of catalyst-transfer conduits, as well as the number of catalyst access openings disposed along the length of each, is dependent upon the design configuration of each of the individual reaction zones in the entire multiple-stage system. Principal factors are the lengths and diameters of the reaction chamber, the outer catalyst-retaining screen and the scalloped perforated centerpipe; as above stated, the last two determine the quantity of catalyst disposed in the reaction zone and especially the effective width of the annular-form bed. Other considerations involve the desired quantity and quality of the catalytically reformed product, and the operating severity level needed to achieve these results. The latter determine the catalyst regeneration rate which, in turn, dictates the rate at which catalyst particles must be withdrawn from the last reaction zone. A number of these considerations will also dictate the quantity and size of the smaller apertures which are disposed 180° opposite the catalyst access openings. In this regard, the limitation on maximum size is determined by the nominal diameter of the catalyst particles. In contrast to the situation where substantial areas of stagnant catalyst exist, the use of the described scalloped perforated centerpipe and catalyst-transfer conduits produces uniform catalyst withdrawal throughout the annular-form bed.

Particularly preferred catalyst-transfer conduits contain a plurality of internal, inwardly-inclined baffles, each one of which extends downwardly to reduce the cross-sectional area of the conduits above each of the access openings therein. These baffles serve to divert catalyst particles, flowing through the conduits, away from the next lower catalyst access opening. These inclined baffles may terminate in the same horizontal plane which contains the lower periphery of the catalyst access openings, below the access openings, or above the access openings. Similarly, they may simultaneously terminate in the vertical plane containing the axis of the conduit, or in a vertical plane between the axis and the centerpipe, or in a vertical plane between the axis and the catalyst access openings.

From the lowermost terminus of each inclined baffle, a vertical baffle extends to a point above the uppermost periphery of the next succeeding catalyst access opening. In a particularly preferred configuration, the lower terminus of each succeeding lower inclined baffle and the vertical baffle extending downwardly therefrom lies in a vertical plane which is a lesser distance from the catalyst access openings than the vertical plane in which the preceding upper inclined baffle and its vertical baffle lies. These catalyst-transfer, or withdrawal conduits afford a more uniform distribution of lateral catalyst particle flow and tend to equalize catalyst residence time within the chamber.

The perforated, scalloped centerpipe, with or without the internally-disposed perforated, cylindrical centerpipe, contains from about three to about sixteen individual scallops which are circumferentially and uniformly disposed. Thus, where three such scallops are employed, they will be 120° apart; sixteen scallops will be 22.5° apart. Perforations in the scallops are sized to inhibit the passage therethrough of catalyst particles;

the apertures may be in the shape of circles, squares, rectangles, triangles, narrow horizontal slits, etc. In a preferred form of construction, the scallops are fabricated from a wedge-shaped wire, having substantially flat faces, horizontally affixed to vertical support members to provide a continuous slit. The wide side of the wedge-shaped wire faces into the bed of catalyst particles. The previous discussion of the prior art makes reference to U.S. Pat. No. 3,706,536(Cl. 23-288G). In FIG. 4 thereof, catalyst-retaining screen 14 and perforated centerpipe 15 are fabricated from a plurality of vertically-disposed, wedge-shaped wires 14' and 15', respectively. Where employed herein, the wedge-shaped wire is horizontal to enhance the flow of catalyst particles across the face thereof into the apertures in the catalyst-transfer or withdrawal conduits.

Further description of the catalytic reaction chamber encompassed by our inventive concept will be made in conjunction with the accompanying drawings. Since these are presented for the sole purpose of illustration and explanation, they are not to be considered as drawn to scale.

BRIEF DESCRIPTION OF DRAWINGS

FIG. 9 is a partially-sectioned side elevation of a portion of one of the catalyst-transfer, or withdrawal conduits 17, and illustrates the internal inclined baffles 25 having vertical baffles 26 extending from the lower terminus thereof.

FIG. 10 is a sectioned plan view taken substantially along the line 10—10 of FIG. 9. In this view, vertical baffle 26 is shown as being in the vertical plane containing the axis of the conduit. This is the unnumbered line appearing in conduits 17 as presented in FIGS. 2 and 3.

FIG. 11 is another partially-sectioned side elevation of a portion of a catalyst transfer conduit 17, and shows a varied configuration of access openings 18, inclined baffles 25 and vertical baffles 26.

FIG. 12 is a partially-sectioned side elevation of transfer conduit 17, and is presented to show the particularly preferred internal configuration of inclined baffles 25 and vertical baffles 26, which configuration produces uniform catalyst flow and affords an equalization of catalyst residence time. FIG. 13 is a sectioned view taken upwardly substantially along the line 13—13 of FIG. 12.

DETAILED DESCRIPTION OF DRAWINGS

Figure 1:
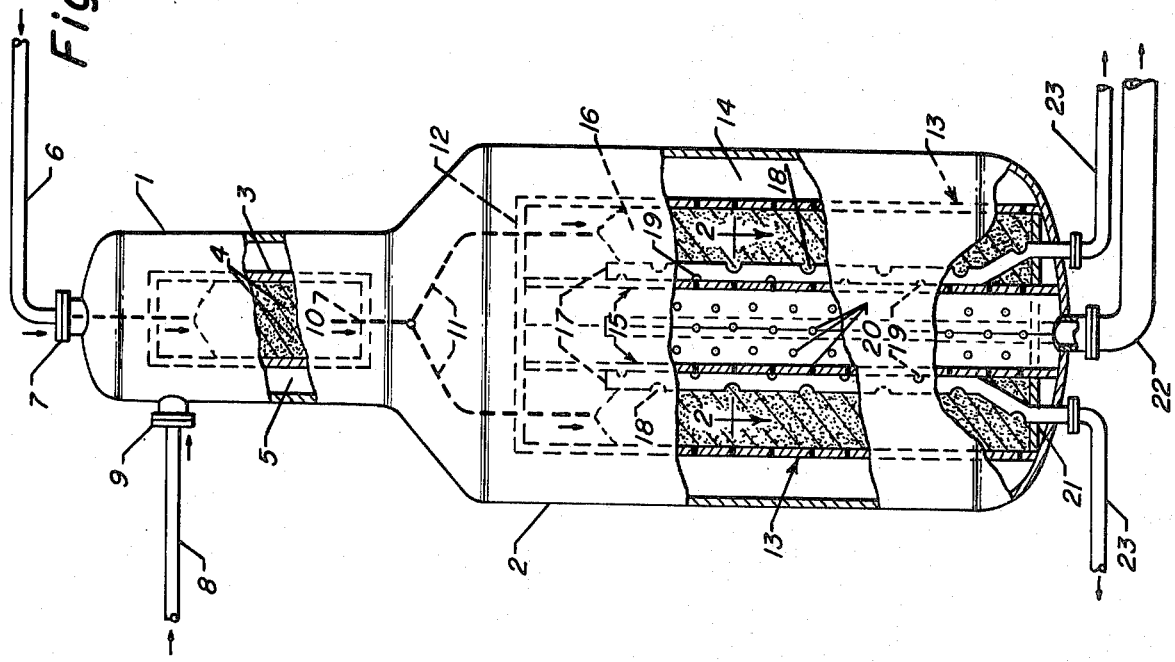
FIG. 1 is a partially-sectioned elevation of a radial-flow catalytic reaction chamber 2, wherein catalyst particles are movable via gravity-flow. The reaction vessel is shown as communicating with a catalyst-holding pre-heat zone 1. Therefore, the illustrated reaction vessel is the first zone into which the reactant stream and fresh, or regenerated catalyst particles are initially introduced.

As hereinbefore stated, FIG. 1 includes a catalyst introduction chamber 1 in which catalyst-holding zone 3 serves as a preheat section for the catalyst particles, prior to the introduction thereof into the reaction zone system, via indirect contact with the reactant stream charge. Therefore, catalytic reaction chamber 2 is the first reaction zone in the system which the reactant stream "sees". Subsequent reaction chambers will generally be of the same configuration (minus, of course, the catalyst introduction chamber), but not necessarily having the same dimensions.

Fresh and/or regenerated catalyst particles 4 are introduced, via line 6 and inlet port 7 into holding zone 3. Vaporous reactants, hydrogen and naphtha boiling range hydrocarbons are introduced, via conduit 8 and inlet port 9, into the annular space 5 formed between the interior wall of chamber 1 and holding zone 3. This indirect heat-exchange serves to maintain the catalyst particles at an elevated temperature until such time as they are introduced into the reaction chamber.

When catalyst particles are withdrawn from the lowermost, or last reaction zone in the system, and gravity-flow of catalyst particles commences throughout the system, particles will be withdrawn from holding zone 3 by way of conduit 10. These will be uniformly distributed through a plurality (generally from about three to about sixteen) of catalyst inlet conduits 11 into annular-form space 16. This annular-form catalyst bed is defined by outer catalyst-retaining screen member 13 and a scalloped perforated centerpipe 15. The reactant stream flows into and around the outer annulus 14, being estopped from directly entering the catalyst bed by imperforate top plate 12. From outer annulus 14, the reactant stream flows laterally and radially through the retaining screen 13, into and through the annular bed 16 of catalyst particles 4 and into scalloped perforated centerpipe 15. The reaction product effluent is withdrawn through outlet port 22; since the illustrated reaction chamber 2 is the first zone in the multiple-stage system, the product effluent will be introduced into an external interstage heater in which the temperature is increased prior to the introduction thereof into the next succeeding reaction zone.

Catalyst particles, which would otherwise become pinned against a cylindrical perforated centerpipe, as a result of the high vapor velocities laterally across the catalyst bed, are caused to flow into and through apertures 18 in catalyst-transfer conduits 17 (generally numbering from about three to about sixteen). Apertures 18 face into annular catalyst bed 16, and are disposed substantially along the entire length of conduits 17. At least one such aperture is located proximate to the bottom of the catalyst bed as defined by imperforate horizontal plate member 21. As particles are withdrawn from the last reaction zone in the series, for transport to suitable regeneration facilities, downward flow via gravity commences, and the catalyst particles flow out of reaction chamber 2 through transfer tubes 17. In the present illustration, the external portions 23 of transfer conduits 17 will enter the uppermost portion of the next succeeding reaction zone, thus being considered the catalyst inlet conduits thereto. The vertical distance between the outlet of catalyst inlet conduits 11 and the upper end of transfer conduits 17 is determined by the angle of repose assumed by catalyst particles 4; this distance is such that the open upper terminus of conduits 17 is above the bed of catalyst. Catalyst transfer conduits 17 contain a second plurality of apertures 19 which are disposed substantially 180° opposite the larger apertures 18. Whereas the latter are sized to permit the catalyst particles to flow therethrough, the former are sized to inhibit catalyst particle flow, but permit the flow of reactant stream into scalloped perforated centerpipe 15, by way of openings 20. The catalyst particles within the transfer conduits 17 are thereby maintained in a hydrogen-rich atmosphere.

Figure 3:
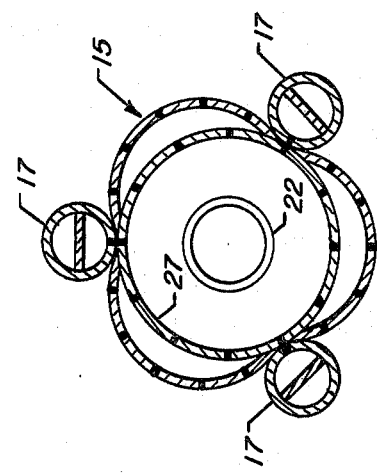
In FIG. 3, the three scallops are shown as attached to and surrounding a cylindrical, perforated centerpipe 27. In both FIGURES, numeral 22 refers to the product effluent outlet conduit.
Figure 2:
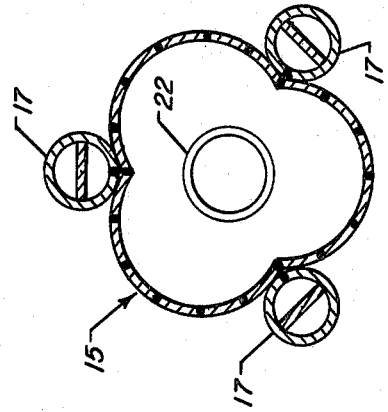
FIG. 2 is a partially-sectioned view, only of scalloped centerpipe 15 and catalyst-transfer conduits 17, taken substantially along the line 2—2 of FIG. 1.

FIG. 2 is an enlarged, partially-sectioned plan view taken substantially along the line 2—2 of FIG. 1. The vessel wall of reaction chamber 2, catalyst-retaining screen 13 and catalyst particles 16 have been eliminated for clarity and simplification. Scalloped, perforated centerpipe 15 is illustrated as having three scallops (120° apart) which are alternatively circumferentially-disposed with three catalyst-transfer conduits 17. The relationship with product effluent outlet conduit 22 is also shown. FIG. 3 is identical with the exception of including the modification where scalloped centerpipe 15 is fabricated around a currently-employed cylindrical perforated centerpipe 27.

Figure 5:
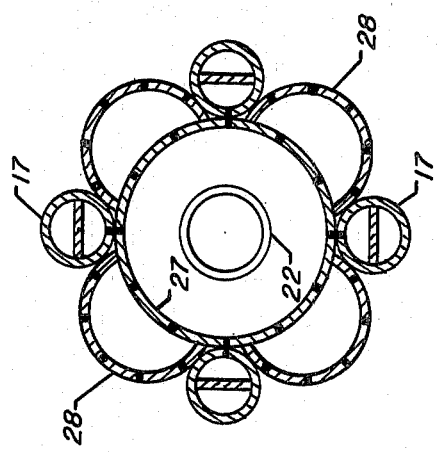
FIGS. 4 and 5, partially-sectioned plan views, illustrate four scallops 28 and four catalyst-transfer conduits 17, without and with a cylindrical centerpipe, respectively.
Figure 4:
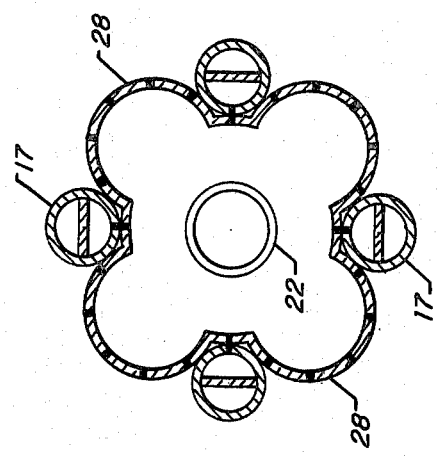

FIG. 4 is another partially-sectioned plan view illustrating a four-scallop perforated centerpipe 28 in alternating configuration with four catalyst-transfer conduits 17. FIG. 5 is identical, again with the exception of showing the configuration with an existing cylindrical perforated centerpipe 27.

Figure 8:
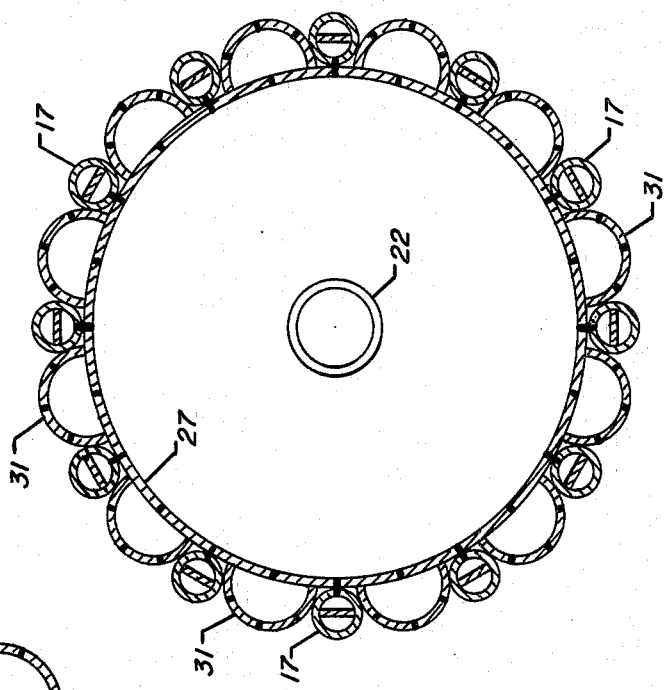
FIGS. 6, 7 and 8 are partially-sectioned plan views illustrating six scallops 29, eight scallops 30 and twelve scallops 31, respectively.
Figure 7:
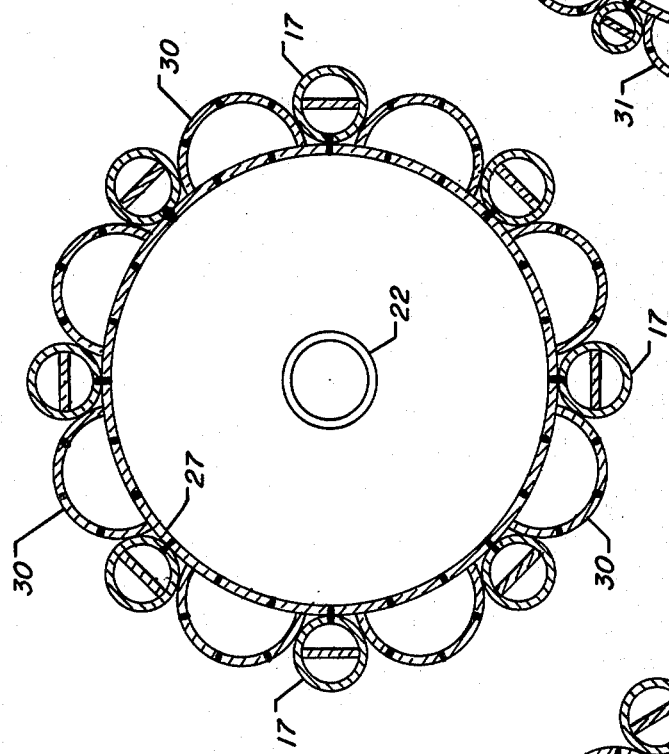
Figure 6:
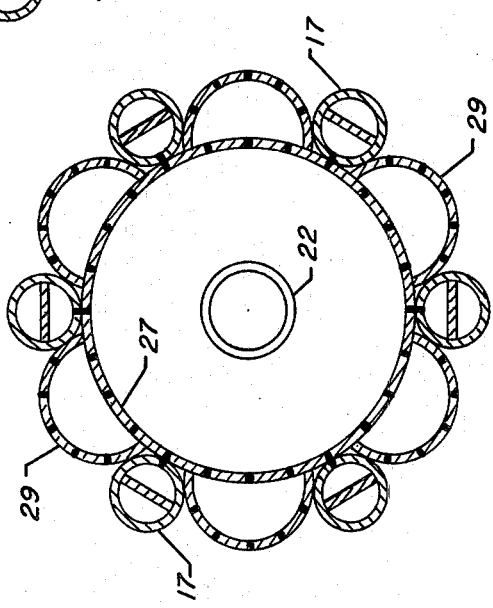

FIG. 6 is a partially-sectioned plan view showing a scalloped centerpipe having six scallops 29, alternating with six catalyst-transfer conduits 17. FIG. 7 illustrates a scalloped centerpipe having eight scallops 30, while FIG. 8 shows a scalloped centerpipe with twelve scallops 31.

FIG. 9 is a partially-sectioned side elevation of a portion of one of the catalyst transfer, or withdrawal conduits 17, enlarged to clarify apertures, or catalyst openings 18 and the relationship thereof to internal inclined baffles 25. The inclined baffles extend downwardly and inwardly from the uppermost periphery 24 of openings 18; in this view, the inclined baffles 25 terminate in the vertical plane containing the axis of the cylindrical conduit and also above the horizontal plane containing the lowermost periphery of aperture 18. A vertical baffle 26 extends downwardly from the lower terminus of each of the inclined baffles 25 and terminates above the uppermost periphery of the next succeeding lower catalyst opening 18. The smaller apertures 19 are shown as being 180° opposite inclined baffles 25 as well as catalyst access openings 18. FIG. 10 is a sectioned plan view taken substantially along the line 10—10 of FIG. 9. This shows vertical baffle 26 which is the unnumbered line in the plan views of FIGS. 2 through 8.

FIG. 11 is another partially-sectioned side elevation of one of the catalyst transfer conduits 17 presented to illustrate another configuration of openings 18, inclined baffles 25 and vertical baffles 26. Here the inclined baffle terminates in the vertical axis of the conduit and in the horizontal plane containing the uppermost periphery of the catalyst access opening 18. The small apertures 19 which face the perforated centerpipe are again shown as being substantially 180° opposite the internal inclined baffles 25.

FIG. 12 is still another sectioned side elevation of a catalyst transfer conduit 17, and shows the particularly preferred configuration and relationship of catalyst access openings 18, inclined baffles 25 and vertical baffles 26. FIG. 13 is a plan view looking upwardly substantially along the line 13—13 of FIG. 12. Each succeeding lower inclined baffle terminates in a vertical plane which is closer to the vertical plane containing catalyst access openings 18 than the vertical plane in which the preceding upper inclined baffle terminates. The same, as the Figure indicates, can be said regarding vertical baffles 26, 26a, 26b, 26c and 26d. That is, the distance between the vertical baffles and the vertical plane containing catalyst access openings 18 decreases in the direction of catalyst particle flow in a downwardly direction through the transfer conduit.

The foregoing specification, especially when viewed in conjunction with the accompanying drawings, clearly describes the catalytic reaction chamber having integrated therein the scalloped, perforated centerpipe of the present invention. As will be recognized, difficulties attendant catalyst pinning are substantially alleviated.

We claim as our invention:

1. A catalytic reaction chamber for effecting contact of a reactant stream with catalyst particles which are (1) disposed therein as an annular-form bed and, (2) downwardly movable therethrough via gravity-flow, said reaction chamber comprising, in cooperative relationship:
   (a) an outer, perforated catalyst-retaining screen (i) concentrically-disposed within and, (ii) having a cross-sectional area less than said chamber to provide a reactant stream manifold space therebetween;
   (b) an inner, perforated scalloped centerpipe (i) concentrically-disposed within and, (ii) having a cross-sectional area less than said catalyst-retaining screen to provide said annular-form catalyst bed therebetween;
   (c) a plurality of catalyst inlet conduits connected to the upper portion of said chamber and communicating with said annular-form catalyst bed; and,
   (d) a plurality of vertically-positioned catalyst-transfer conduits (i) circumferentially-disposed substantially adjacent the outer surface of said scalloped centerpipe, (ii) extending substantially the entire length of said annular-form catalyst bed and, (iii) containing a first plurality of apertures facing into said catalyst bed and sized to permit catalyst particles to flow therethrough, and a second plurality of apertures facing said perforated centerpipe and sized to inhibit the flow of catalyst particles therethrough.

2. The catalytic reaction chamber of claim 1 further characterized in that the first and second pluralities of apertures in said catalyst-transfer conduits are disposed along the length thereof.

3. The catalytic reaction chamber of claim 1 further characterized in that said catalyst inlet conduits number from three to sixteen.

4. The catalytic reaction chamber of claim 1 further characterized in that said catalyst-transfer conduits number from three to sixteen.

5. The catalytic reaction chamber of claim 1 further characterized in that said scalloped centerpipe has disposed therein, and is in contact with, a second, substantially cylindrical perforated centerpipe.

6. The catalytic reaction chamber of claim 1 further characterized in that the number of scallops forming said scalloped centerpipe is from three to sixteen.

7. The catalytic reaction chamber of claim 1 further characterized in that said catalyst-transfer conduits contain a plurality of internal, inclined baffles, each one of which extends downwardly from the uppermost periphery of each of the apertures in said first plurality.

8. The catalytic reaction chamber of claim 7 further characterized in that each of said inclined baffles terminates in the horizontal plane containing the lowermost periphery of the apertures in said first plurality, and in the vertical plane containing the axis of said conduits.

9. The catalytic reaction chamber of claim 7 further characterized in that a vertical baffle extends from the lower terminus of each of said inclined baffles and terminates above the uppermost periphery of the next succeeding aperture in said first plurality.

10. The catalytic reaction chamber of claim 7 further characterized in that each of said inclined baffles terminates in the vertical plane containing the axis of said conduits at a point above the lowermost periphery of each aperture in said first plurality.

11. The catalytic reaction chamber of claim 7 further characterized in that the apertures in the second plurality are substantially 180° opposite the surface of each of said inclined baffles.

12. The catalytic reaction chamber of claim 7 further characterized in that each succeeding lower inclined baffle terminates in a vertical plane a lesser distance from the vertical plane containing said first plurality of apertures than the vertical plane in which the preceding upper inclined baffle terminates.

* * * * *